April 11, 1972 J. A. SHEAFFER Re. 27,326

TRUNNION VALVE FOR CONTINUOUS ROTARY FILTER

Original Filed Dec. 20, 1967 5 Sheets-Sheet 1

INVENTOR.
JOHN A. SHEAFFER

BY Theodore M. Jablon

ATTORNEY.

TRUNNION VALVE FOR CONTINUOUS ROTARY FILTER

Original Filed Dec. 20, 1967 5 Sheets-Sheet 2

INVENTOR.
JOHN A. SHEAFFER
BY Theodore M. Jablon
ATTORNEY.

TRUNNION VALVE FOR CONTINUOUS ROTARY FILTER

Original Filed Dec. 20, 1967 5 Sheets-Sheet 3

INVENTOR.
JOHN A. SHEAFFER
BY Theodore M. Jablon
ATTORNEY.

TRUNNION VALVE FOR CONTINUOUS ROTARY FILTER

Original Filed Dec. 20, 1967 5 Sheets-Sheet 4

INVENTOR.
JOHN A. SHEAFFER
BY Theodore M. Jablon
ATTORNEY.

TRUNNION VALVE FOR CONTINUOUS ROTARY FILTER

Original Filed Dec. 20, 1967 5 Sheets-Sheet 5

INVENTOR.
JOHN A. SHEAFFER
BY:
Theodore M. Jablon
ATTORNEY.

United States Patent Office

Re. 27,326
Reissued Apr. 11, 1972

27,326
TRUNNION VALVE FOR CONTINUOUS ROTARY FILTER

John A. Sheaffer, South Norwalk, Conn., assignor to Dorr-Oliver Incorporated, Stamford, Conn.

Original No. 3,455,454, dated July 15, 1969, Ser. No. 692,085, Dec. 20, 1967. Application for reissue Oct. 1, 1969, Ser. No. 868,248
Int. Cl. B01d *33/08, 33/06, 33/02*
U.S. Cl. 210—91 42 Claims

Matter enclosed in heavy brackets [ ] appears in the original patent but forms no part of this reissue specification; matter printed in italics indicates the additions made by reissue.

ABSTRACT OF THE DISCLOSURE

Improved trunnion valve for rotary filters providing a bridge plate assembly having simple and compact means for adjusting the bridge blocks from the outside, thereby varying the extent and location of respective operating zones of the filtration cycle without necessitating the dismounting of the valve.

This invention relates to continuous rotary filters having an assembly of filter chambers mounted to rotate about a horizontal axis on a pulp containing vat.

This class of filters may include disc type filters, drum filters having the filter media attached to the drum, as well as belt-type drum filters, all of which have a trunnion at the end of the rotatable assembly, provided with internal filtrate discharge ducts spaced about the axis, and extending from the vertical end face of the trunnion to the respective filter chambers.

More in particular, this invention relates to improvements in the so-called trunnion valve containing the so-called bridges or bridge blocks which cooperate with the end face of the trunnion and the filtrate discharge ducts in controlling the phases or zones of the filtration cycle.

The operating zones in the filtration cycle may require adjustments of the bridge blocks, to be effected for example during start-up or to meet changing conditions in the filter operation.

One object of this invention therefore is to provide simple, practical, and compact means for independently adjusting the position as well as the effective arcuate extent of the respective operating zones in the filtration cycle. More particularly, these adjusting means should be operable in a manner which avoids the previous cumbersome necessity of dismounting the trunnion valve to gain access to the bridge blocks so that they might be re-positioned or exchanged.

In its simplest form the operating cycle itself may comprise a vacuum cake forming or pick-up zone effective during submergence of the filter chambers in the pulp; vacuum cake drying zone subsequent to the cake forming zone, effective after emergence of the filter chambers from the pulp; and a neutral zone following the drying zone to allow filter cake to be discharged before re-immersion of the filter chambers in the pulp, and extending down to the starting point of the submerged cake pick-up zone.

A single source of vacuum may serve both the cake formation and the cake drying zone. But if a wash liquid be applied to the filter cake after emergence, then a second neutral zone may be interposed between the cake forming zone and a combined cake washing and drying zone, in order that two filtrate fractions may be collected in separate receivers. A corresponding additional bridge block providing an interposed neutral zone, and cooperating with corresponding additional partitioning means in the stationary valve member will provide for such a fractionation.

Furthermore, where indicated, filter cake discharge may be assisted by the inclusion in the filtration cycle of a blow-back zone interposed between two neutral zones functionally separating the blow-back effect from the preceding drying zone and from the subsequent cake forming or pick-up zone.

Normally, two critical points in the filtration cycle requiring adjustment independent of each other are the starting point of the cake discharge zone and the starting point of the cake pick-up zone.

According to this invention, independent or universal adjustment of the operating zones is made possible conveniently by the provision of a valve plate assembly in face to face relationship with the end face of the rotating trunnion and with the stationary valve member. In this assembly, the adjustable bridge blocks are mounted in a valve plate member, each block having a stem or bolt extending radially outwardly through a slot in the peripheral rim portion of the valve plate member. The slots are coextensive with the periphery, thus allowing for angular adjustment or positioning of the blocks in the valve plate member about the filter axis. The blocks are secured in adjusted position by the tightening of the radial bolts.

According to the invention, the extent and location of the operating zones of the filtration cycle may be varied by the provision of means whereby the valve plate itself together with the blocks is rotationally adjustable even while the blocks are individually adjustable.

The invention also provides novel practical indicator means that are easily applicable, to provide a measure of the setting of the bridge blocks when in operation, and also designed so that the setting may be restored in case the valve is taken down for overhaul.

Other features and advantages will hereinafter appear.

FIG. 8b is a view taken on line 8b—8b in FIG. 8a.

Figure 1:
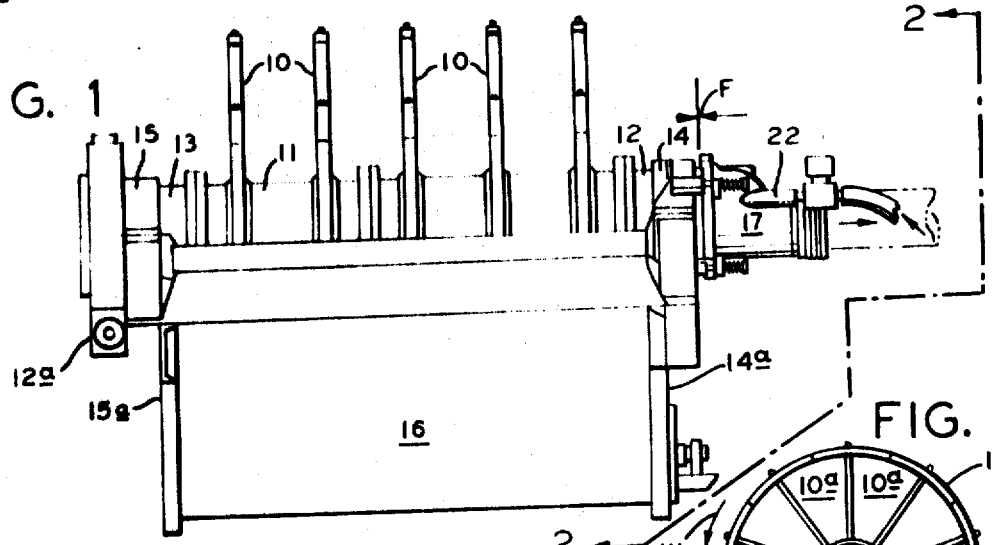
FIG. 1 is a side view of a continuous rotary disc filter with the trunnion valve embodying the invention.
Figure 2:
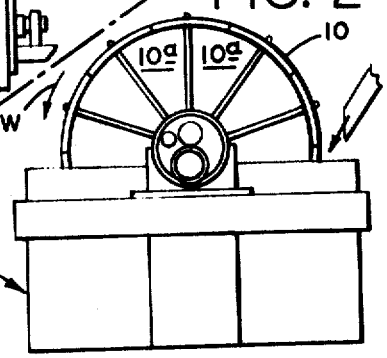
FIG. 2 is a view upon the valve end of the filter, taken on line 2—2 of FIG. 1.

The invention, by way of example, is herein shown embodied in a disc filter generally illustrated in FIGS. 1 and 2. Accordingly, an assembly of filter chambers rotatable about a horizontal axis comprises a series of filter discs 10 mounted upon a filter shaft 11, in horizontally spaced relationship to one another. The trunnion ends 12 and 13 of the shaft rotate in trunnion bearings 14 and 15 mounted upon respective end walls 14a and 15a of a vat 16, so that the lower portions of the discs will be immersed into a body of pulp in the vat.

Each filter disc in turrn constitutes an assembly of sector-shaped filter chambers 10a (see FIG. 2) having filter media mounted thereon at both sides. Each sector of each disc registers horizontally with corresponding sectors of all the other discs, so that there are as many horizontal rows of sectors as there are sectors in each disc. Rotation of this assembly about the shaft in the direction of arrow W will cause the filter chambers of each disc to pass sequentially through the pulp. Filter cake collected on the filter discs may be discharged at the descending side thereof in a conventional manner here not shown, but preferably employing back-blow to facilitate and expedite cake discharge.

Figure 5:
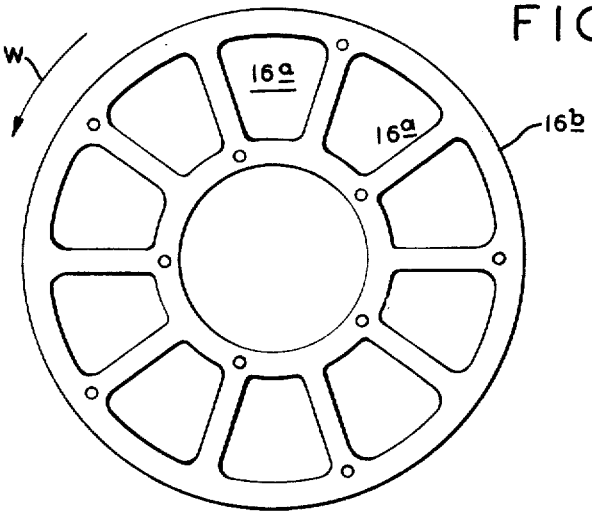
FIG. 5 is a cross-sectional view taken on line 5—5 of FIG. 4, showing the end face of the trunnion.

Within the filter shaft there are provided horizontal filtrate discharge ducts 15a (see FIG. 5) parallel to and equally spaced around the axis. Each of these ducts inwardly communicates with a respective row of filter sectors or chambers, and outwardly terminates in the transverse or vertical end face of the trunnion end 12 of the shaft. This end face of the trunnion is represented by a conventional wear plate 16b the openings of which register with the ducts. The rotating trunnion end face 16c cooperates in face-to-face sliding contact with a stationary so-called trunnion valve T, the vertical plane of working contact or interface being indicated at F. The opposite end of the filter shaft is closed. Drive means 12a are indicated at this end for rotating the shaft.

Trunnion valve T controls the filtration cycle incident to the rotation of the filter shaft, so that a pressure differential or vacuum and, if need be, back-blow air pressure may be applied to the filter chamber 10a within respective zones or phases of the filtration cycle. A required period of submergence of the filter chambers occurs in the cake forming phase, followed by a cake washing and/or cake drying phase after emergence at the ascending side of the discs. At the descending side, back-blow acts to detach the cake in the discharge zone.

Figure 3:
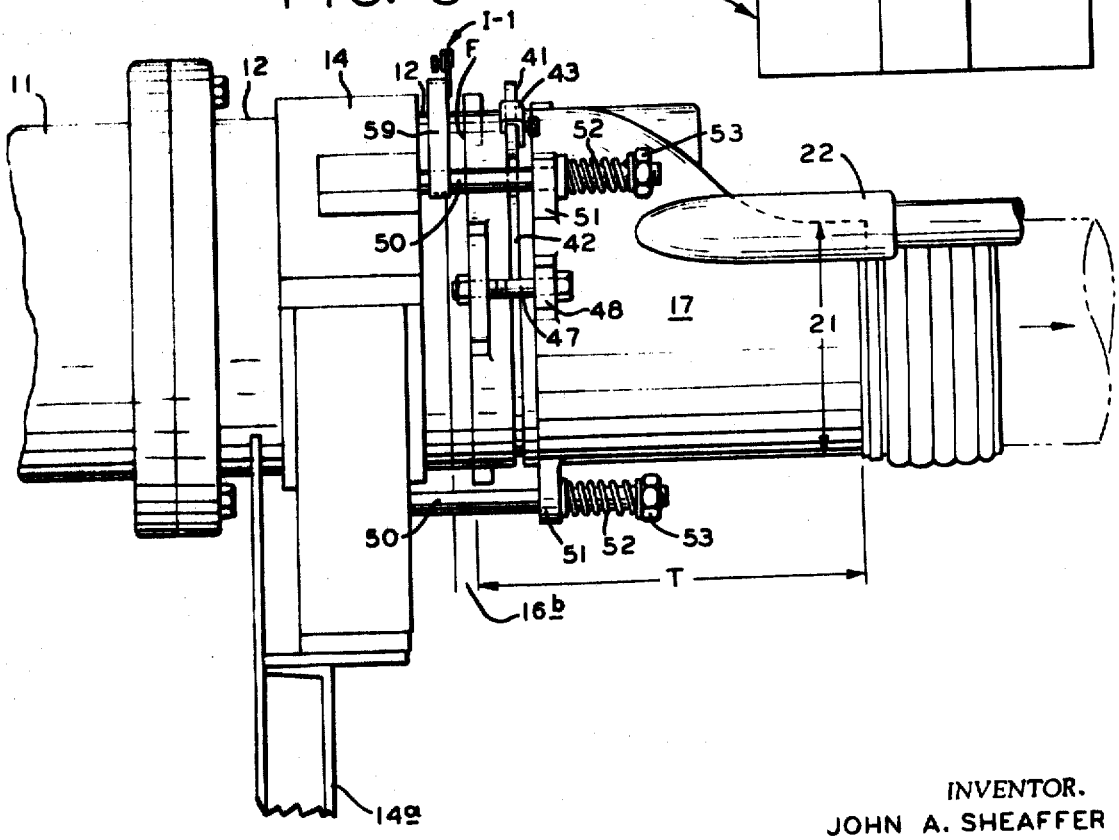
FIG. 3 is an enlarged side view of the trunnion valve, showing the bridge plate assembly embodying the invention.

The improved trunnion valve of this invention as shown in FIG. 3, provides improvements in the bridge plate assembly, controlling the filtration cycle. FIGS. 3 to 11 derived therefrom will serve in the following description of the invention in more detail.

Figure 4:
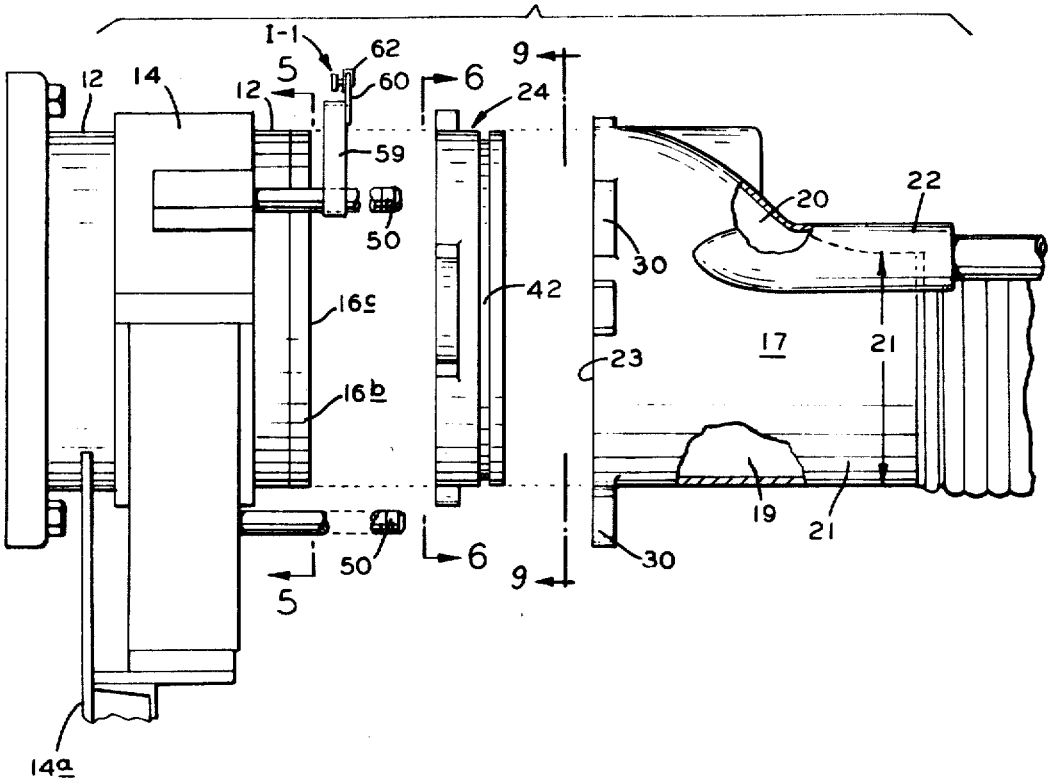
FIG. 4 is an exploded view of the trunnion valve of FIG. 3, showing the bridge plate assembly separated from the associated parts.

The trunnion valve according to FIGS. 3 and 4 comprises a hollow open-ended manifold or stationary valve member 17 provided internally with a partition 18 (see FIG. 6) which separates a vacuum supply chamber 19 from a back-blow air supply chamber 20 (see FIG. 4), the vacuum being supplied through a wide neck 21 and the back-blow air through a narrow neck [22.] *22, providing air supply which breaks the vacuum.*

The vertical inner end face 23 of the manifold member (see FIG. 4) has attached thereto the bridge plate assembly 24 (see FIGS. 4, 6, 9) with the bridge blocks therein adjustable from the outside for independently controlling the location of certain operating zones or phases in the filtration cycle without necessitating the dismounting of the trunnion valve.

In the improved bridge plate assembly according to the embodiment in FIGS. 6, 7, 8, and 9, a bridge plate 25 comprises an outer peripheral rim portion 26, a central hub portion or disc portion 27, and an intermediate arcuate plate portion 28 rigidly interconnecting the rim portion and the disc portion, thus forming a shallow groove 29 of an arcuate length L–1 and the width d. The flat bottom of this groove provides a flow blocking area A–1 complementary to an arcuate throughflow area or opening A–2 having an arcuate length L–2. Along the arcuate sides of the throughflow area A–2 there are shoulders 30 and 31 respectively having faces 32 (see FIG. 7) co-planar with the bottom face 33 of the shallow groove. The throughflow area A–2 registers with the vacuum supply chamber 19 of the stationary valve member. The bottom of the shallow groove has a backblow opening 34 registering with the backblow supply chamber 20 of the stationary valve member.

The first or upper bridge block 35 is slidably adjustable in the upper end portion of the shallow groove by way of loosening and tightening the bolt 36 threaded into the bridge block. This bolt extends radially outwardly from the bridge block through a slot 37 provided in the rim portion 26 peripherally co-extensive therewith. Loosening this bolt will allow the bridge block to be shifted in the groove within an arculate or angular range corresponding to the length of the slot. Tightening the bolt will secure the block in the adjusted position. The bolt also extends through the curved base plate or body portion 38 of an index pointer 39 cooperating with a scale 40 provided on an index plate 41 which is press-fitted into a peripheral groove 42 (see FIGS. 7 and 8) provided upon rim portion 26. Thus, when the bolt 36 is loosened and the block is shifted, the pointer will move with the block from one point to another on the scale, thus registering the amount of angular adjustment of the block.

The pointer also cooperates with a companion indicator 43 (see FIGS. 6, 7, 8, 8a, 8b) mounted upon the index plate, and slideable thereon along the scale. This indicator 43 is securable by means of thumb screw 44 or the like in any adjusted position of the index plate relative to the scale, as well as relative to the pointer.

Following the adjustment of the bridge block, the companion indicator 43 may be secured on the index plate in a position registering with the pointer 39. The companion indicator thus provides a reference point whereby the amount of angular adjustment is measurable, or whereby an adjusted position of the bridge block may be restored. This bridge block has a blowback opening 45 registering with blowback opening 34 in the bridge plate, which latter opening in turn registers with the backblow supply chamber 20 of the stationary valve member.

A second or lower bridge block 46 is adjustable in the lower end of the shallow groove 29, substantially in the same manner as the bridge block 35.

A first fastening means or bolts 47 secure the bridge plate assembly in face-to-face relationship to the stationary valve member 17, thus constituting therewith a stationary sub-assembly. These bolts extend from lugs 48 on the stationary valve member through respective arcuate slots 49 (see FIG. 6) provided on the rim portion of the bridge plate to permit rotational adjustment of the bridge plate assembly as a whole, in addition to individual adjustment of the bridge blocks.

Second fastening means or bolts 50 in turn hold the stationary sub-assembly in face-to-face relationship with the end face 16c of the trunnion. These bolts, however, being fixed to, or being threaded tightly into, the trunnion bearing 14, extend through respective lugs 51 on the stationary valve member 17. A compression spring 52 surrounding the outer projecting free end of each such bolt, and confined between the lug 51 and a nut 53, maintains the cooperative face-to-face relationship between the trunnion end face 16c and the aforementioned sub-assembly or trunnion valve T.

Figure 6:
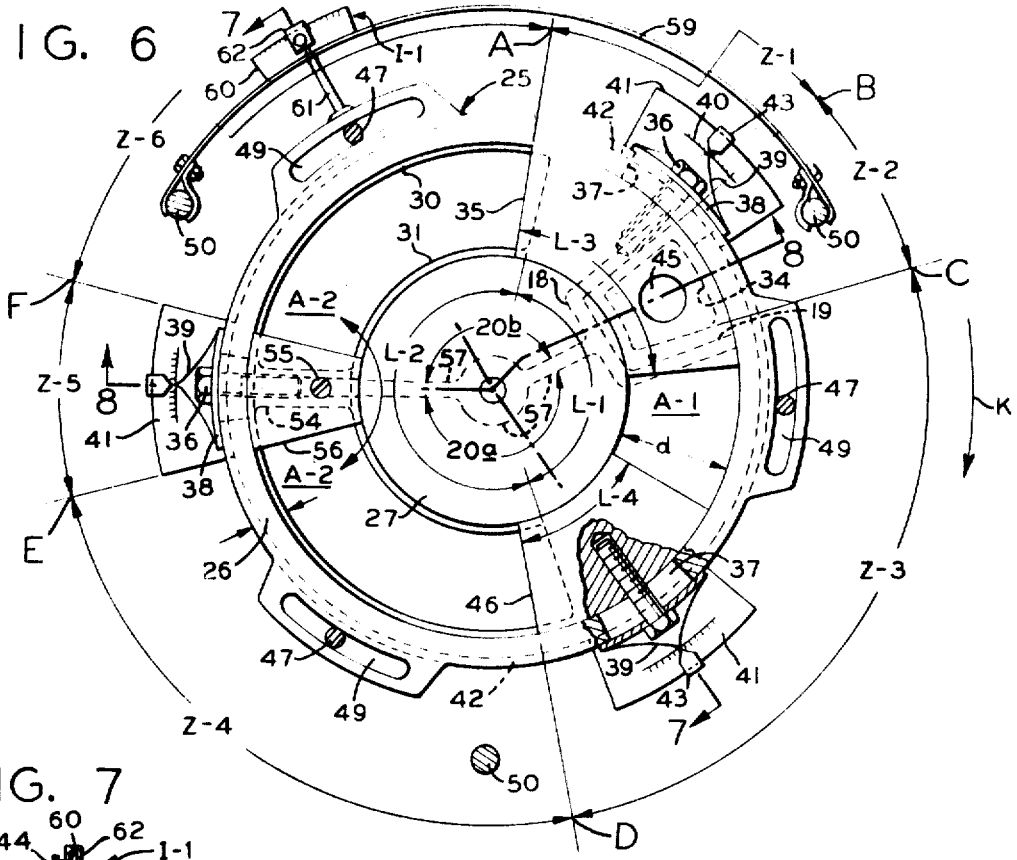
FIG. 6 is a cross-sectional view taken on line 6—6 of FIG. 4, showing one side of the bridge plate assembly according to one embodiment thereof, including various adjustment indexing means.
Figure 7:
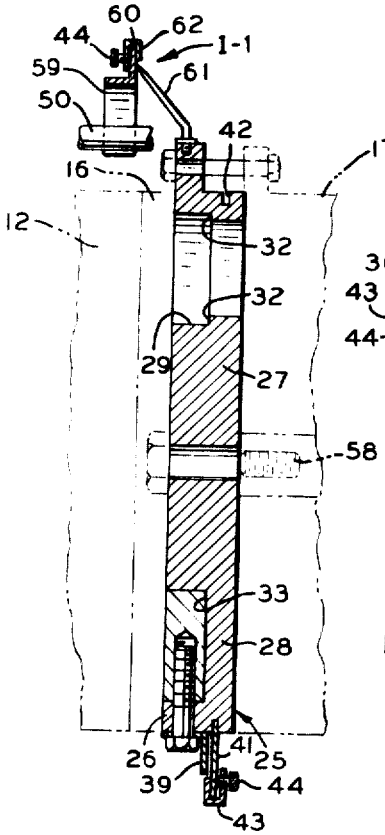
FIG. 7 is a sectional view of the bridge plate assembly, taken on line 7—7 in FIG. 6.
Figure 8:
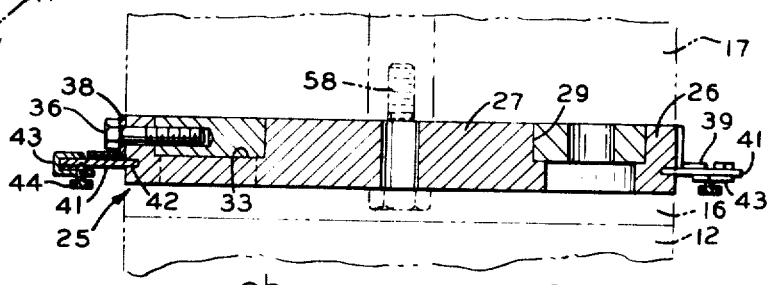
FIG. 8 is a sectional view of the bridge plate assembly, taken on line 8—8 of FIG. 6.
Figure 8A:
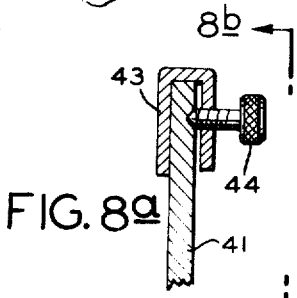
FIG. 8a is an enlarged detail view of indexing means from FIG. 8.
Figure 8B:
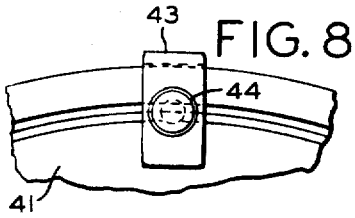

In the embodiment of FIG. 6, the throughflow area A–2 is subdivided by a rib 54 to which is fastened by means of screw 55 a third bridge block 56 providing a third neutral zone functionally separating a cake formation zone from a subsequent cake-washing and/or cake-drying zone, each of which zones may be connected to a separate vacuum receiver, in order that strong filtrate liquor may be handled separate from the weak liquor or spent wash liquid. Accordingly, the vacuum chamber 20 in the stationary valve member is provided with a further partition 57 (see FIG. 6) dividing it into vacuum chamber 20a and 20b for receiving the strong filtrate liquor and the spent wash liquor respectively.

In this embodiment the bridge plate is centered relative to the stationary valve member, and thus also relative to the trunnion axis, by means of a bolt 58 (see FIGS. 7 and 8) threaded into partition 57 (see FIG. 6).

In FIG. 6 with the filter rotating in the direction of arrow K the setting of the bridge blocks individually and the setting of the bridge plate assembly as a whole, provide an example of a filtration cycle which comprises:

(a) a first neutral zone Z–1 (between points A and B);
(b) a blowback cake discharge zone Z–2 (between points B and C);
(c) a second neutral zone Z–3 (between points C and D);
(d) a first vacuum or cake formation zone Z–4 (between ponts D and E);
(e) a third neutral zone Z–5 ( between points E and F);
(f) a second vacuum or cake washing and/or drying zone Z–6 (between points F and A).

An index device I–1 is for the purpose of registering the angular position of the bridge plate relative to the trunnion bearing 14. The device therefore comprises an arched element or curved steel strap 59 having its end fastened or clamped to respective horizontal bolts 50 (see FIG. 6), and bearing a scale or index plate 60 cooperating with a pointer 61 fixed upon the bridge plate 25. A companion index member 62 for the pointer is shown to be settable on the index plate in the manner and for the purpose described above for the other index devices in FIG. 6.

Figure 9:
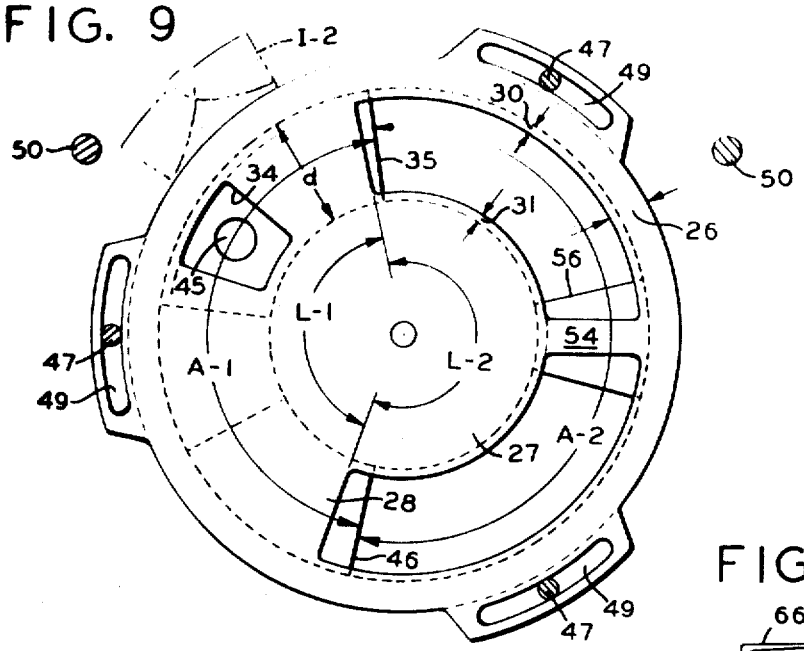
FIG. 9 is a view of the opposite side of the bridge plate assembly of FIG. 6, taken on line 9—9 of FIG. 4.
Figure 10A:
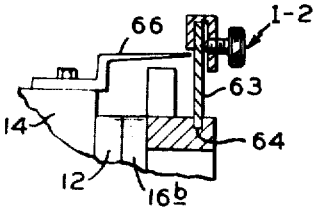
FIG. 10a is a detail sectional view taken on line 10a—10a in FIG. 10, showing another form of indexing means.
Figure 10:
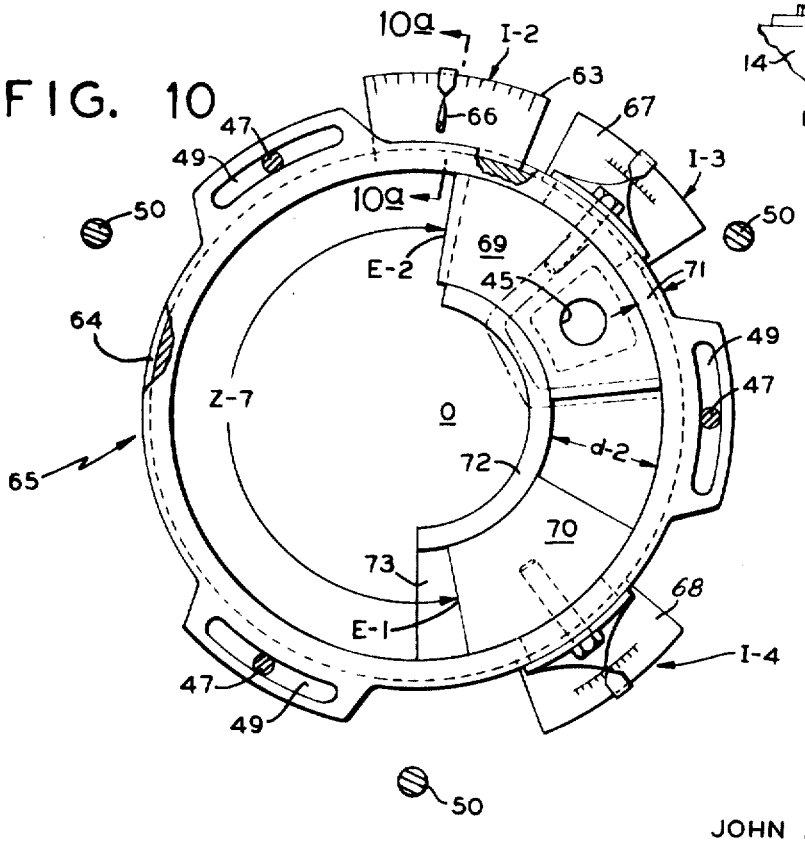
FIG. 10 is a view similar to FIG. 6 of a bridge plate assembly embodying the invention in a modified construction.
Figure 11:
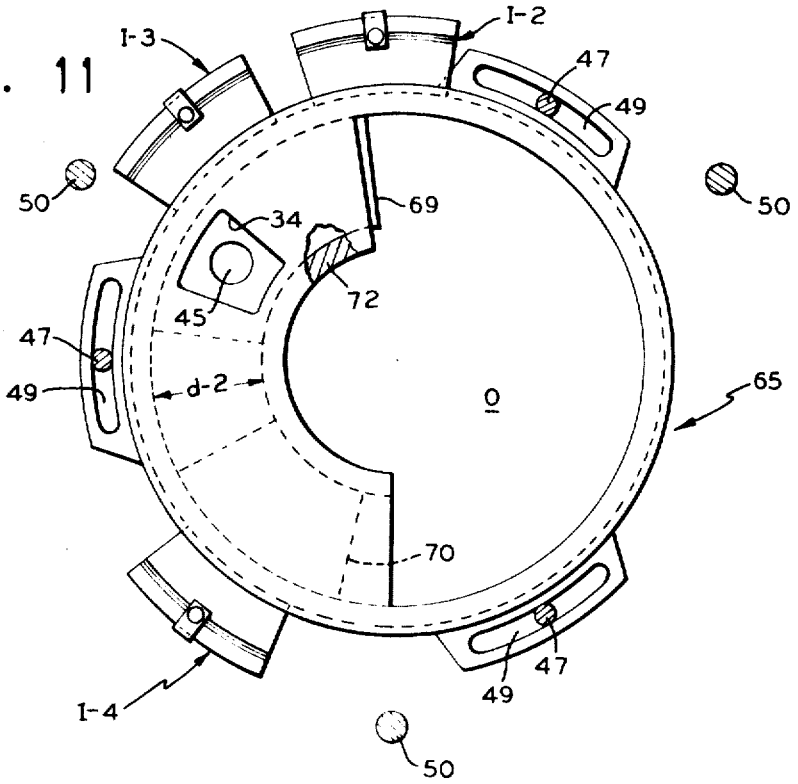
FIG. 11 shows the opposite side of the bridge plate assembly of FIG. 10.

Another embodiment of the bridge plate assembly according to FIGS. 10 and 11, differs from the embodiment of FIGS. 6 and 9 insofar as the cake formation zone merges with a subsequent cake washing and/or drying zone into a single large zone Z–7 effective between end points E–1 and E–2.

This then provides a single large throughflow passage area or opening O for the joint volumes of filtrate liquor and spent wash liquor to be collected in a single vacuum receiver. Otherwise, the filtration cycle and the adjustment means in this embodiment may be the same as those described above for the embodiment of FIGS. 6 and 9. Furthermore, in the embodiment of FIGS. 10, 10a, and 11 an index device I–2 for registering the position of the bridge plate assembly relative to the trunnion bearing, comprises an index plate 63 press-fitted into a peripheral groove 64 on the brdige plate 65 and cooperating with a pointer 66 mounted on the trunnion bearing 14.

Groove 64 also holds index plates 67 and 68 of index devices I–3 and I–4 of associated bridge blocks 69 and 70 respectively. These bridge blocks are adjustable substantially in the manner above described, in a shallow groove defined by an outer peripheral rim portion 71 of the bridge plate, and by an inner semi-cylindrical wall portion 72 concentric with the rim portion and connected rigidly thereto by the flat bottom portion 73 of the groove.

I claim:

1. A trunnion valve for rotary filters having a horizontal axis of rotation and having a pressure differential cake-forming zone, a pressure differential drying zone and a backblow cake discharge zone, comprising in combination, a trunnion supporting the filter for rotation, said trunnion having an end face, filtrate discharge ducts in the trunnion a stationary valve member having an end face parallel to and in opposed relation to said trunnion face, said valve member face having openings connected respectively with a source of pressure differential and a source of backblow, a bridge plate, means supporting said bridge plate for limited angular adjustment in substantially fluid tight face to face contact with said end faces, said bridge plate having pressure differential and blow openings registering with the openings in said valve member, and the trunnion face openings at pre-determined annular positions thereof, the bridge plate having an annular groove intersecting the bridge plate openings, and at least one bridge block adjustable in the groove, whereby the extent and location of said zones may be varied by angular adjustment of the bridge plate and block as a whole about said axis, and by individual adjustment of the bridge block with respect to the bridge plate.

2. The trunnion valve according to claim 1, with the addition of means extending from said bridge block through the adjoining peripheral rim portion of said bridge plate, for effecting adjustment of said block.

3. A trunnion valve for rotary filters having a horizontal axis of rotation, and having a pressure differential cake-forming zone, a pressure differential cake drying zone, and a backblow cake discharge zone, which zones are functionally separated from one another by a first and a second neutral zone, said trunnion valve comprising a trunnion and trunnion bearing, filtrate discharge ducts in the trunnion equally spaced about the horizontal axis, and terminating in the end face of the trunnion, a stationary valve member having an end face parallel to said end face of said trunnion, said valve member face having openings connected respectively with a source of pressure differential and a source of backblow, a bridge plate located between said trunnion and said stationary valve member concentric and in substantially fluid-tight face to face contact therewith, said bridge plate member having an outer annular rim portion, and having an arcuate groove extending internally along said rim portion, said groove having an inner arcuate portion, and presenting an arcuate flow blocking area having a backblow opening communicating with the backblow opening in said stationary valve member, and also defining a complementary throughflow opening within said rim portion, communicating with the pressure differential opening in said stationary valve member, said outer rim portion having within the range of said groove an upper slotted opening elongated in the direction of the periphery of the rim portion, and a lower similar slotted opening, an upper bridge block fitted into said arcuate groove, and having a backblow passage opening substantially registering with said backblow opening in the groove, said bridge block being adjustable in said groove for adjusting the end of said vacuum drying zone and the location of said blowback zone respectively, and a lower bridge block movable in said arcuate groove for adjusting the beginning of the cake-forming zone, each of said bridge blocks having a stem extending radially outwardly therefrom through a respective slotted opening, whereby each block is movable in said bridge plate within a range corresponding to the extent of said slotted openings, securing means for fixing the adjusted position of said stems and blocks, first fastening means operable for maintaining said bridge plate member and said hollow valve member concentrically connected with one another, so as to constitute a sub-assembly, and second fastening means operable to maintain said sub-assembly cooperating concentrically with said trunnion in the operation of the filtration cycle during rotation of said trunnion and said assembly of filter chambers.

4. The trunnion valve according to claim 3, wherein said first fastening means are constructed and arranged so as to allow for rotational adjustment of said bridge plate about said axis relative to said stationary valve member.

5. The trunnion valve according to claim 3, wherein said inner arcuate portion of the bridge plate is of substantially semi-circular shape, providing for a correspondingly large complementary throughflow area.

6. The trunnion valve according to claim 3, wherein said inner arcuate portion of the bridge plate member is in the shape of a substantially semi-cylindrical wall, providing for a correspondingly large complementary throughflow area.

7. The trunnion valve according to claim 3, wherein said inner arcuate portion of the bridge plate member is provided by a hub plate portion defining with said outer rim portion an arcuate throughflow area complementary to the area closed by said blocks, wherein said outer rim portion and said hub portion each have a shoulder extending along the arcuate length of said arcuate throughflow area and co-planar with the bottom face of said arcuate groove, wherein said throughflow area is divided by a rib extending radially substantially horizontally between said hub plate portion and said outer rim portion, and having parallel vertical end faces co-planar with the outer end face of said bridge plate and with the faces of said shoulders respectively, and wherein a third bridge block is provided in said groove, associated with said rib, providing a third neutral zone in the filtration cycle for separate collection of filtrate liquids derived from respective operating zones of the filtration cycle.

8. The trunnnion valve according to claim 3, wherein said stems are in the form of a screw bolt threaded into the respective blocks.

9. The trunnion valve construction according to claim 3, with the addition of index means for registering the adjusted position of each of said bridge blocks, comprising for each block an index scale provided on said outer rim portion, and a pointer member connected to the stem so as to be movable therewith, and cooperating with said index scale.

10. The trunnion valve according to claim 9, wherein said outer rim portion has an external peripheral groove, and wherein said index scale comprises a scale plate press-fitted into said groove.

11. The trunnion valve according to claim 9, wherein said outer rim portion has an external peripheral groove, wherein said stems are in the form of a screw bolt threaded into respective blocks, with the addition of means for registering the adjusted position of each said bridge block, comprising for each block and index plate press-fitted into said groove, and a pointer member connected to the stem so as to be movable therewith, and cooperating with said scale member.

12. The trunnion valve according to claim 11, wherein said pointer member comprises a body portion hugging the outer face of said outer rim portion, and said bolt extends through said body portion of the pointer member, so that tightening said bolt will fix said block and said pointer member relative to said index plate.

13. The trunnion valve according to claim 3, wherein said outer rim portion has an external peripheral groove, with the addition of means for registering the adjusted position of each of said bridge blocks, comprising for each said block an index plate press-fitted into said groove, and a pointer member connected to the stem of the block so as to be movable therewith, and cooperating with said index plate, and a companion index member for said pointer member, settable upon said index plate.

14. The trunnion valve according to claim 13, wherein said stem comprises a bolt threaded into the respective block, and extending through said pointer member so that tightening said bolt will fix said block and said pointer member in adjusted position relative to said index plate.

15. The trunnion valve according to claim 3, wherein said first fastening means are constructed and arranged so as to allow for rotational adjustment of said bridge plate relative to said stationary valve member, with the addition of means for registering the adjusted position of each of said bridge block, comprising for each block an index scale provided on said outer rim portion, and a pointer member connected to the stem of the block so as to be movable therewith, and cooperating with said index scale, and additional index means effective between said bridge plate member and said trunnion bearing, for registering the adjusted position of said bridge plate.

16. The trunnion valve according to claim 15, wherein said additional index means comprise an index plate press-fitted into said peripheral groove, and a pointer carried by said trunnion bearing, cooperating with said index plate.

17. In a trunnion valve for a rotary filter having a horizontal axis of rotation, a bridge plate assembly which comprises a bridge plate member having an outer annular rim portion, and having an arcuate groove extending internally along said rim portion, said groove having an inner arcuate portion, and presenting an arcuate flow blocking area having a backblow opening, and also defining a complementary throughflow opening within said rim portion, said outer rim portion having within the range of said groove an upper slotted opening elongated in the direction of the periphery of the rim portion, and a lower similar slotted opening, an upper bridge block fitted into said arcuate groove, and having a backblow passage opening substantially registering with said backblow opening in the groove, said bridge block being adjustable in said groove, and a lower bridge block movable in said arcuate groove for adjusting the beginning of the cake-forming zone, each of said bridge blocks having a stem extending radially outwardly therefrom through a respective slotted opening, whereby each block is movable in said bridge plate within a range corresponding to the extent of said slotted openings, and securing means for fixing the adjusted position of said stems and blocks.

18. The bridge plate assembly according to claim 17, wherein said first fastening means are constructed and arranged so as to allow for rotational adjustment of said bridge plate member about said axis relative to said stationary hollow valve member.

19. The bridge plate assembly according to claim 17, wherein said inner arcuate portion of the bridge plate member is in the shape of a substantially semi-cylindrical wall, providing for a correspondingly large complementary throughflow area.

20. The bridge plate assembly according to claim 17, wherein said inner arcuate portion of the bridge plate member is provided by a hub plate portion defining with said outer rim portion an arcuate throughflow area complementary to the area closed by said blocks, wherein said outer rim portion and said hub portion each have a shoulder extending along the arcuate length of said arcuate throughflow area, and co-planar with the bottom face of said arcuate groove, wherein said throughflow area is divided by a rib extending radially substantially horizontally between said hub plate portion and said outer rim portion, and having parallel vertical end faces co-planar with the outer end face of said bridge plate member and with the faces of said shoulders respectively, and wherein a third bridge block is provided in said groove, associated with said rib, providing a third neutral zone in the filtration cycle for separate collection of filtrate liquids derived from respective operating zones of the filtration cycle.

21. The bridge plate assembly according to claim 17, wherein said stems are in the form of a screw bolt threaded into the respective blocks.

22. The bridge plate assembly according to claim 17, wherein said inner arcuate portion of the bridge plate is of substantially semi-circular shape such as to provide for a correspondingly large complementary throughflow area.

23. The bridge plate assembly according to claim 22, wherein said outer rim portion has an external peripheral groove, with the addition of means for registering the adjusted position of each of said bridge blocks, comprising for each said block an index plate press-fitted into said groove, and a pointer member connected to the stem of the block so as to be movable therewith, and cooperating with said index plate, and a companion index member for said pointer member, settable upon said index plate.

24. The bridge plate assembly according to claim 23, wherein said stem comprises a bolt threaded into the respective block, and extending through said pointer member so that tightening said bolt will fix, said block and said pointed member in adjusted position relative to said index plate.

25. The bridge plate assembly according to claim 17, wherein said first fastening means are constructed and arranged so as to allow for rotational adjustment of said bridge plate relative to said stationary valve member, with the addition of means for registering the adjusted position of each of said bridge block, comprising for each block an index scale provided on said outer rim portion, and a pointer member connected to the stem of the block so as to be movable therewith, and cooperating with said index scale, and additional index means effective between said bridge plate member and said trunnion bearing, for registering the adjusted position of said bridge plate member.

26. The bridge plate assembly according to claim 25, wherein said additional index means comprise an index plate press-fitted into said peripheral groove, and a pointer carried by said trunnion bearing, cooperating with said index plate.

27. The bridge plate assembly according to claim 17, with the addition of index means for registering the adjusted position of each of said bridge blocks, comprising for each block an index scale provided on said outer rim portion, and a pointer member connected to the stem so as to be movable therewith, and cooperating with said index scale.

28. The bridge plate assembly according to claim 27, wherein said outer rim portion has an external peripheral groove, and wherein said index scale comprises an index plate press-fitted into said groove.

29. The bridge plate assembly according to claim 27, wherein said outer rim portion has an external peripheral groove, wherein said stems are in the form of a screw bolt threaded into respective blocks, with the addition of means for registering the adjusted position of each said bridge block, comprising for each block an index plate press-fitted into said groove, and a pointer member connected to the stem so as to be movable therewith, and cooperating with said scale member.

30. The bridge plate assembly according to claim 29, wherein said pointer member comprises a body portion hugging the outer face of said outer rim portion, and said bolt extends through said body portion of the pointer member, so that tightening said bolt will fix said block and said pointer member relative to said index plate.

*31. In a trunnion valve for a rotary filter having a horizontal axis of rotation, a bridge plate assembly which comprises a bridge plate member having an outer annular rim portion, and having an arcuate groove extending internally along said rim portion, and presenting an arcuate flow blocking area at one side of said rim portion, and having an opening in the upper portion thereof and also defining a throughflow opening within said rim portion opposite to said blocking area, said rim portion having within the range of said groove an upper opening and a lower opening.*

*an upper bridge block fitted into said arcuate groove, and having a passage opening substantially registering with said opening in the groove, said bridge block being adjustable in said groove,*

*a lower bridge block movable in said arcuate groove for adjusting the beginning of the cake forming zone, said bridge blocks and upper and lower openings in the rim portion being constructed and arranged relative to each other so that said bridge blocks are accessible and adjustable through the respective upper and lower openings,*

*and means for securing the position of said blocks.*

*32. The bridge plate assembly according to claim 31, with the addition of detachable closure means for said upper and lower openings.*

*33. The bridge plate assembly according to claim 31, wherein at least one of said bridge blocks has a projection extending into the associated opening and operable for adjustment of the blocks, said projection and said opening being dimensioned relative to each other so as to allow for said adjustment.*

*34. In a trunnion valve for a rotary filter having a horizontal axis of rotation, a bridge plate assembly which comprises a bridge plate member having an outer annular rim portion, and having an arcuate groove extending internally along said rim portion, and presenting an arcuate flow blocking area at one side of said rim portion, and having an opening in the upper portion thereof, and also defining a throughflow opening within said rim portion, opposite said blocking area, said rim portion having within the range of said groove an upper opening,*

*an upper bridge block fitted into said arcuate groove, and having a passage opening substantially registering with said opening in the groove, said bridge block being adjustable in said groove, said bridge block and said upper opening being constructed and arranged relative to each other so that said upper bridge block is accessible and adjustable through said upper opening, means for securing the position of said upper block,*

*a lower bridge block movable in said arcuate groove for adjusting the beginning of the cake forming zone, and means for securing the position of said lower block.*

*35. In a trunnion valve for a rotary filter having a horizonal axis of rotation, a bridge plate assembly which comprises a bridge plate member having an outer annular rim portion, and having an arcuate groove extending internally along said rim portion, and presenting an arcuate flow blocking area at one side of said rim portion, and having a throughflow opening in the upper portion thereof, within said rim portion, opposite to said blocking area, said rim portion having within the range of said groove a lower opening,*

*an upper bridge block fitted into said arcuate groove, and having a passage opening substantially registering with said opening in the groove, said bridge block being adjustable in said groove,*

*a lower bridge block movable in said arcuate groove for adjusting the beginning of the cake forming zone, said bridge block and said lower opening being constructed and arranged relative to each other so that said lower bridge block is accessible and adjustable through said lower opening,*

*and means for securing the positions of said blocks.*

*36. A trunnion valve for rotary filters having a horizontal axis of rotation, and having a pressure differential cake forming zone, a pressure differential cake drying zone, and a cake discharge zone, said trunnion valve comprising a trunnion and trunnion bearing, filtrate discharge ducts in the trunnion equally spaced about the horizontal axis, and terminating in the end face of the trunnion,*

*a stationary valve member having an end face parallel to said end face of the trunnion, said valve member face having one passage opening connected with a source of pressure differential, providing vacuum, and having another passage opening communicating with an air supply,*

*a bridge plate located between said trunnion and said stationary valve member concentric and in substantially fluid-tight face to face contact therewith, said bridge plate member having an outer annular rim portion, and having an arcuate groove extending in-*

*ternally along said rim portion, and having an inner arcuate portion, and presenting an arcuate flow blocking area having a passage opening communicating with said other passage opening in said stationary valve member, and also defining a throughflow opening within said rim portion opposite to said blocking area, communicating with the vacuum opening in said stationary valve member, said outer rim portion having within the range of said groove an upper opening and a lower opening,*

*an upper bridge block fitted into said arcuate groove, and having a passage opening substantially registering with said other opening in the groove, said bridge block being adjustable in said groove through said upper opening,*

*a lower bridge block movable in said arcuate groove for adjusting the beginning of the cake forming zone, said bridge blocks and said upper and lower openings being constructed and arranged relative to each other so that said blocks are accessible and adjustable through said upper and said lower opening respectively,*

*securing means for fixing the adjusted position of said blocks,*

*first fastening means operable for maintaining said bridge plate member and said hollow valve member concentrically connected with one another, to constitute a sub-assembly,*

*and second fastening means operable to maintain said sub-assembly cooperating concentrically with said trunnion in the operation of the filtration cycle during rotation of said trunnion and said filter chambers.*

*37. The trunnion valve according to claim 36 wherein at least one of said blocks has a projection extending into the respective associated opening in the rim portion, operable for adjusting said block.*

*38. The trunnion valve according to claim 36, wherein said first fastening means are constructed and arranged so as to allow for rotational adjustment of said bridge plate about said axis relative to said stationary valve member.*

*39. In a trunnion valve for a rotary filter having a horizontal axis of rotation, a bridge plate assembly which comprises a bridge plate member having an outer annular rim portion and having an arcuate groove extending internally along said rim portion, and presenting a flow blocking area at one side of said rim portion, and also defining a throughflow opening within said rim portion opposite to said blocking area, said rim portion having within the range of said groove a radially directed upper opening,*

*an upper bridge block fitted into said arcuate groove, and being adjustable in said groove and relative to said blocking area, said block and said upper opening being constructed and arranged relative to each other so that said upper bridge block is accessible and adjustable through said upper opening,*

*and a lower bridge block fitted into said arcuate groove, and movable in said arcuate groove and relative to said blocking area for adjusting the beginning of the cake forming zone.*

*40. In a trunnion valve for a rotary filter having a horizontal axis of rotation, a bridge plate assembly which comprises a bridge plate member having an outer annular rim portion and having an arcuate groove extending internally along said rim portion, and presenting a flow blocking area at one side of said rim portion, and also defining a throughflow opening within said rim portion opposite to said blocking area, said rim portion having within the range of said groove a lower radially directed opening,*

*an upper bridge block fitted into said arcuate groove, and movable for adjustment in said groove and relative to said blocking area,*

*and a lower bridge block fitted into said arcuate groove, and being adjustable in said groove and relative to said blocking area for adjusting the beginning of the cake forming zone, said block and said lower opening being constructed and arranged relative to each other so that said upper bridge block is accessible and adjustable through said lower opening.*

*41. In a trunnion valve for a rotary filter having a horizontal axis of rotation, a bridge plate assembly which comprises a bridge member having an outer annular rim portion and having an arcuate groove extending internally along said rim portion, and presenting a through flow area, said rim portion having a radially directed opening,*

*at least one bridge block fitted into said arcuate groove, and blocking a corresponding area of said through flow opening, and being adjustable in said groove for adjusting a respective operating zone of a filtration cycle, said bridge block and said radially directed opening being constructed and arranged relative to each other so that said block is accessible and adjustable through said radially directed opening.*

*42. In a trunnion valve for a rotary filter having a horizontal axis of rotation, a bridge plate assembly which comprises a bridge plate member having an outer annular rim portion and having an arcuate groove extending peripherally along said rim portion, and presenting a throughflow area, said rim portion having a plurality radially directed spaced openings,*

*and a corresponding number of bridge blocks fitted into said arcuate groove, and blocking corresponding areas of said through flow opening, and being adjustable in said groove for adjusting respective operating zone of a filtration cycle, said bridge blocks and the associated radially directed openings being constructed and arranged relative to each other so that said blocks are accessible and adjustable through said radially directed openings.*

References Cited

The following references, cited by the Examiner, are of record in the patented file of this patent or the original patent.

UNITED STATES PATENTS

| | | | |
|---|---|---|---|
| 2,289,762 | 7/1942 | Duvall | 210—404 X |
| 2,899,068 | 8/1959 | King et al. | 210—404 X |
| 3,027,011 | 3/1962 | Flynn | 210—404 |
| 3,143,105 | 7/1965 | Putnam | 210—331 |
| 3,220,554 | 11/1965 | Burchert et al. | 210—404 X |
| 3,409,134 | 11/1968 | Wallace et al. | 210—331 X |

FRANK A. SPEAR, Jr., Primary Examiner

U.S. Cl. X.R.

210—331, 333, 401, 404